(12) United States Patent
Pisklak et al.

(10) Patent No.: US 9,909,051 B2
(45) Date of Patent: *Mar. 6, 2018

(54) CEMENT SET ACTIVATORS FOR SET-DELAYED CEMENT COMPOSITIONS AND ASSOCIATED METHODS

(71) Applicant: Halliburton Energy Services, Inc., Houston, TX (US)

(72) Inventors: Thomas J. Pisklak, Cypress, TX (US); Kyriacos Agapiou, Houston, TX (US); Pauline A. Otieno, Spring, TX (US); Ronnie G. Morgan, Waurika, OK (US); Peter J. Boul, Houston, TX (US); Lance E. Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/951,133

(22) Filed: Nov. 24, 2015

(65) Prior Publication Data

US 2016/0075933 A1 Mar. 17, 2016

Related U.S. Application Data

(60) Division of application No. 13/854,115, filed on Mar. 31, 2013, now Pat. No. 9,227,872, which is a continuation-in-part of application No. 13/417,001, filed on Mar. 9, 2012, now Pat. No. 8,851,173.

(51) Int. Cl.
| | |
|---|---|
| *C09K 8/467* | (2006.01) |
| *C04B 7/34* | (2006.01) |
| *E21B 33/13* | (2006.01) |
| *C09K 8/42* | (2006.01) |
| *C04B 28/18* | (2006.01) |
| *C04B 14/06* | (2006.01) |
| *C04B 40/06* | (2006.01) |
| *C04B 22/16* | (2006.01) |
| *C04B 28/10* | (2006.01) |
| *C04B 111/10* | (2006.01) |

(52) U.S. Cl.
CPC ............... *C09K 8/467* (2013.01); *C04B 7/34* (2013.01); *C04B 14/06* (2013.01); *C04B 14/062* (2013.01); *C04B 22/16* (2013.01); *C04B 28/10* (2013.01); *C04B 28/18* (2013.01); *C04B 40/0658* (2013.01); *C09K 8/428* (2013.01); *E21B 33/13* (2013.01); *C04B 2111/1037* (2013.01); *C09K 2208/10* (2013.01)

(58) Field of Classification Search
CPC ......... C04B 7/34; C04B 14/062; C04B 14/06; C04B 22/16; C04B 28/10; C04B 28/18; C04B 40/0658; C04B 2111/1037; C09K 8/467; C09K 8/428; C09K 2208/10; E21B 3/133

See application file for complete search history.

(56) References Cited

U.S. PATENT DOCUMENTS

| | | | |
|---|---|---|---|
| 2,411,793 A | 11/1946 | Kennedy | |
| 2,848,051 A | 8/1958 | Williams | |
| 3,238,279 A | 3/1966 | Tarlton | |
| 3,557,876 A | 1/1971 | Tragesser | |
| 3,699,042 A | 10/1972 | Browning et al. | |
| 3,874,207 A | 4/1975 | Lemelson | |
| 3,887,009 A | 6/1975 | Miller et al. | |
| 3,959,003 A | 5/1976 | Ostroot et al. | |
| 4,054,462 A | 10/1977 | Stude | |
| 4,274,881 A | 6/1981 | Langton et al. | |
| 4,349,443 A | 9/1982 | Block | |
| 4,350,533 A | 9/1982 | Galer et al. | |
| 4,462,837 A | 7/1984 | Baker et al. | |
| 4,515,216 A | 5/1985 | Childs et al. | |
| 4,519,452 A | 5/1985 | Tsao et al. | |
| 4,524,828 A | 6/1985 | Sabins et al. | |
| 4,676,832 A * | 6/1987 | Childs ................... | C04B 24/003 106/727 |
| 4,818,288 A | 4/1989 | Aignesberger et al. | |

(Continued)

FOREIGN PATENT DOCUMENTS

| | | |
|---|---|---|
| WO | 1996020899 | 7/1996 |
| WO | 2013134456 A1 | 9/2013 |
| WO | 2015034477 | 3/2015 |

OTHER PUBLICATIONS

Polish Search Report for Polish Application No. P-413825 dated Dec. 7, 2015.
"Liquid Stone Cement Technology", Product Sales Bulletin, BJ Services Company, pp. 1-2, Oct. 19, 2004.
HES Brochure "Micro Matrix Cement Retarder", H01481, Aug. 2007.
HES Brochure "CFR-3 Cement Friction Reducer", H01325, Oct. 2005.
Hess Pumice Products Inc., "Fact Sheet", located at website www.hesspumice.com, printed from internet Mar. 2012.

(Continued)

*Primary Examiner* — Anthony J Green
(74) *Attorney, Agent, or Firm* — Craig W. Roddy; Tumey L.L.P.

(57) ABSTRACT

Disclosed herein are cement compositions and methods of using set-delayed cement compositions in subterranean formations. A method of cementing in a subterranean formation, may comprise providing a set-delayed cement composition comprising water, pumice, hydrated lime, and a set retarder, activating the set-delayed cement composition with a cement set activator, wherein the cement set activator comprises at least one activator selected from the group consisting of nanosilica, a polyphosphate, and combinations thereof, introducing the set-delayed cement composition into a subterranean formation, and allowing the set-delayed cement composition to set in the subterranean formation.

16 Claims, No Drawings

(56) References Cited

U.S. PATENT DOCUMENTS

| | | | |
|---|---|---|---|
| 4,875,937 A | 10/1989 | Viles | |
| 5,058,679 A | 10/1991 | Hale et al. | |
| 5,263,542 A | 11/1993 | Brothers | |
| 5,314,022 A | 5/1994 | Cowan et al. | |
| 5,447,197 A | 9/1995 | Rae et al. | |
| 5,501,277 A | 3/1996 | Onan | |
| 5,503,671 A | 4/1996 | Casabonne et al. | |
| 5,547,506 A | 8/1996 | Rae et al. | |
| 6,173,778 B1 | 1/2001 | Rae et al. | |
| 6,221,148 B1 | 4/2001 | Mathur | |
| 6,279,655 B1 | 8/2001 | Pafitis et al. | |
| 6,333,005 B1 | 12/2001 | Nguyen et al. | |
| 6,457,523 B1 | 10/2002 | Vijn et al. | |
| 6,488,762 B1 | 12/2002 | Shi | |
| 6,610,140 B2 | 8/2003 | Vijn et al. | |
| 6,613,142 B1* | 9/2003 | D'Almeida | C04B 28/08 106/789 |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,199,086 B1 | 4/2007 | Roddy et al. | |
| 7,201,798 B2 | 4/2007 | Brothers et al. | |
| 7,244,303 B2 | 7/2007 | Chatterji et al. | |
| 7,284,611 B2 | 10/2007 | Reddy et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |
| 7,631,692 B2 | 12/2009 | Roddy et al. | |
| 7,670,427 B2 | 3/2010 | Perez-Pena | |
| 7,674,332 B2 | 3/2010 | Roddy et al. | |
| 7,743,828 B2 | 6/2010 | Roddy et al. | |
| 7,757,765 B2 | 7/2010 | Hilleary et al. | |
| 7,784,542 B2 | 8/2010 | Roddy et al. | |
| 7,789,150 B2 | 9/2010 | Roddy et al. | |
| 7,806,183 B2 | 10/2010 | Roddy et al. | |
| 7,836,954 B2 | 11/2010 | Morgan et al. | |
| 7,855,170 B2 | 12/2010 | Perrera et al. | |
| 7,863,224 B2 | 1/2011 | Keys et al. | |
| 7,867,954 B2 | 1/2011 | Warrender et al. | |
| 7,892,352 B2 | 2/2011 | Roddy et al. | |
| 7,964,538 B2 | 6/2011 | Perera et al. | |
| 8,038,790 B1 | 10/2011 | Dubey et al. | |
| 8,048,219 B2 | 11/2011 | Woolfsmith | |
| 8,183,186 B2 | 5/2012 | Luo | |
| 8,281,859 B2 | 10/2012 | Roddy et al. | |
| 8,297,357 B2 | 10/2012 | Brenneis et al. | |
| 8,307,899 B2 | 11/2012 | Brenneis et al. | |
| 8,403,045 B2 | 3/2013 | Brenneis et al. | |
| 8,476,203 B2 | 7/2013 | Patil | |
| 8,486,869 B2 | 7/2013 | Brenneis et al. | |
| 8,492,317 B2 | 7/2013 | Chatterji et al. | |
| 8,505,630 B2 | 8/2013 | Chatterji et al. | |
| 8,851,173 B2* | 10/2014 | Brothers | C04B 28/18 106/792 |
| 9,212,534 B2* | 12/2015 | Ballew | C04B 28/18 |
| 9,227,872 B2* | 1/2016 | Pisklak | C09K 8/428 |
| 9,255,031 B2* | 2/2016 | Pisklak | C04B 40/065 |
| 9,255,454 B2* | 2/2016 | Lewis | E21B 21/01 |
| 9,260,343 B2* | 2/2016 | Brothers | C04B 16/00 |
| 9,328,281 B2* | 5/2016 | Agapiou | C04B 28/18 |
| 9,328,583 B2* | 5/2016 | Pisklak | C04B 28/18 |
| 9,346,711 B2* | 5/2016 | Chatterji | C04B 22/00 |
| 9,371,712 B2* | 6/2016 | Boul | C04B 28/18 |
| 9,505,972 B2* | 11/2016 | Iverson | C04B 28/18 |
| 9,534,165 B2* | 1/2017 | Agapiou | C04B 28/18 |
| 9,580,638 B2* | 2/2017 | Boul | C04B 28/18 |
| 2002/0050232 A1 | 5/2002 | Yamashita et al. | |
| 2002/0162657 A1 | 11/2002 | Tumlin et al. | |
| 2003/0121456 A1 | 7/2003 | Griffith et al. | |
| 2003/0188669 A1 | 10/2003 | Sobolev et al. | |
| 2003/0221778 A1 | 12/2003 | Musch et al. | |
| 2004/0112600 A1 | 6/2004 | Luke et al. | |
| 2004/0127606 A1 | 7/2004 | Goodwin | |
| 2004/0211342 A1 | 10/2004 | Sprouts et al. | |
| 2004/0226484 A1 | 11/2004 | Chatterji et al. | |
| 2005/0079016 A1 | 4/2005 | Greenwood et al. | |
| 2006/0025312 A1 | 2/2006 | Santra | |
| 2006/0041060 A1 | 2/2006 | George et al. | |
| 2006/0054320 A1 | 3/2006 | Brothers | |
| 2006/0166834 A1 | 7/2006 | Roddy et al. | |
| 2006/0249054 A1 | 11/2006 | Brothers et al. | |
| 2006/0249289 A1 | 11/2006 | Brothers et al. | |
| 2007/0051280 A1 | 3/2007 | Fyten | |
| 2007/0089643 A1 | 4/2007 | Roddy et al. | |
| 2007/0125534 A1 | 6/2007 | Reddy et al. | |
| 2007/0235192 A1 | 10/2007 | Michaux et al. | |
| 2007/0289744 A1 | 12/2007 | Bringamon et al. | |
| 2008/0066652 A1 | 3/2008 | Fraser et al. | |
| 2008/0169100 A1 | 7/2008 | Lewis et al. | |
| 2009/0011207 A1 | 1/2009 | Dubey | |
| 2009/0020044 A1 | 1/2009 | Constantz et al. | |
| 2009/0038800 A1 | 2/2009 | Ravi et al. | |
| 2009/0010509 A1 | 4/2009 | Warrender et al. | |
| 2009/0105099 A1 | 4/2009 | Warrender et al. | |
| 2009/0124522 A1 | 5/2009 | Roddy et al. | |
| 2009/0020002 A1 | 8/2009 | Roddy et al. | |
| 2010/0016183 A1 | 1/2010 | Roddy et al. | |
| 2010/0004179 A1 | 2/2010 | Roddy et al. | |
| 2010/0025039 A1 | 2/2010 | Roddy et al. | |
| 2010/0041792 A1 | 2/2010 | Roddy et al. | |
| 2010/0044043 A1 | 2/2010 | Roddy et al. | |
| 2010/0051275 A1 | 3/2010 | Lewis et al. | |
| 2010/0095871 A1 | 4/2010 | Patil | |
| 2010/0240556 A1 | 9/2010 | Keys et al. | |
| 2010/0258312 A1 | 10/2010 | Brenneis et al. | |
| 2010/0270016 A1 | 10/2010 | Carelli et al. | |
| 2010/0273912 A1 | 10/2010 | Roddy et al. | |
| 2010/0028246 A1 | 11/2010 | Brenneis et al. | |
| 2010/0282466 A1* | 11/2010 | Brenneis | C04B 28/021 166/293 |
| 2010/0292365 A1 | 11/2010 | Roddy | |
| 2010/0313795 A1 | 12/2010 | Guynn et al. | |
| 2011/0017452 A1 | 1/2011 | Benkley et al. | |
| 2011/0100626 A1 | 5/2011 | Brenneis et al. | |
| 2011/0132605 A1 | 6/2011 | Sarap et al. | |
| 2011/0162845 A1 | 7/2011 | Ravi et al. | |
| 2011/0265996 A1* | 11/2011 | Lewis | C04B 28/02 166/292 |
| 2011/0305830 A1 | 12/2011 | Frantz et al. | |
| 2012/0018155 A1 | 1/2012 | Patil | |
| 2012/0167803 A1 | 7/2012 | Luo | |
| 2012/0186494 A1 | 7/2012 | Roddy | |
| 2012/0190769 A1 | 7/2012 | Patil | |
| 2012/0192768 A1 | 8/2012 | Ravi | |
| 2012/0211227 A1 | 8/2012 | Thaemlitz | |
| 2012/0214901 A1 | 8/2012 | Bury | |
| 2012/0249552 A1 | 10/2012 | Harvill et al. | |
| 2012/0251079 A1 | 10/2012 | Meschter et al. | |
| 2012/0252304 A1 | 10/2012 | Vaughan | |
| 2012/0291674 A1 | 11/2012 | Brenneis et al. | |
| 2012/0325478 A1 | 12/2012 | Muthusamy et al. | |
| 2013/0043026 A1 | 2/2013 | Taoutaou | |
| 2013/0233550 A1 | 9/2013 | Brothers et al. | |
| 2014/0000893 A1 | 1/2014 | Lewis et al. | |
| 2014/0020895 A1 | 1/2014 | Agapiou et al. | |
| 2014/0034313 A1 | 2/2014 | Piskat et al. | |
| 2014/0034314 A1 | 2/2014 | Lewis et al. | |
| 2014/0048267 A1 | 2/2014 | Pisklak et al. | |
| 2014/0174741 A1 | 2/2014 | Agaoiou et al. | |
| 2014/0083701 A1 | 3/2014 | Boul et al. | |
| 2014/0190696 A1 | 3/2014 | Iverson et al. | |
| 2014/0202698 A1 | 3/2014 | Pisklak et al. | |
| 2014/0090843 A1 | 4/2014 | Boul et al. | |
| 2014/0216746 A1 | 8/2014 | Ballew et al. | |
| 2014/0318419 A1 | 10/2014 | Chatterji et al. | |
| 2014/0318764 A1 | 10/2014 | Chatterji et al. | |
| 2014/0318784 A1 | 10/2014 | Chatterji et al. | |
| 2015/0175481 A1 | 6/2015 | Pisklak et al. | |

(56) References Cited

U.S. PATENT DOCUMENTS

| | | |
|---|---|---|
| 2015/0175869 A1 | 6/2015 | Agapiou et al. |
| 2015/0197033 A1 | 7/2015 | Agapiou et al. |
| 2015/0197453 A1 | 7/2015 | Pisklak et al. |

OTHER PUBLICATIONS

"Conduction Calorimetric Investigation of the effect of Retarders on the Hydration of Portland Cement", V.S. Ramachandram and M.S. Lowery—Thermochimica Arts, 195 (1992) 373-387.
"Competetive Adsorption of Phosphate and Phosphonates onto Geothite", Bernd Nowack and Alan T. Stone—Water Research 40 (2006) 2201-2209.
"Molecular Modeling of the Mechanism of Action of Phosphonate Retarders on Hydrating Cements", Peter V. Coveney and William Humphries—J. Chem. Soc., Faraday Trans., 1996 92(5, 831-841).
Malvern Brochure "Zetasizer Nano ZS" dated 2011.
Nissan Chemical Brochure "Snowtex" dated 2007.
ThermPhos Brochure "Dequest 2006" printed from the internet Mar. 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfield Chemicals Product Range" dated Jul. 2010.
Halliburton Brochure "Micro Matrix" dated Nov. 2006.
Perspectives on Colloidal Silica 2005; AkzoNobel; pp. 1-2; https://www.akzonobel.com/colloidalsilica/silica_facts/perspectives.
USPTO Office Action for U.S. Appl. No. 13/854,115 dated Jul. 15, 2015.
USPTO Notice of Allowance for U.S. Appl. No. 13/854,115 dated Sep. 18, 2015.
USPTO Final Office Action for U.S. Appl. No. 14/048,463 dated Jan. 14, 2016.
Extended European Search Report for European Application No. EP 14 78 0323 dated Oct. 18, 2016.
USPTO Office Action for U.S. Appl. No. 14/032,734 dated Sep. 24, 2015.
USPTO Office Action for U.S. Appl. No. 14/090,494 dated Sep. 24, 2015.
USPTO Office Action for U.S. Appl. No. 14/221,479 dated Sep. 30, 2015.
USPTO Office Action for U.S. Appl. No. 14/194,125 dated Oct. 16, 2015.
USPTO Office Action for U.S. Appl. No. 14/202,625 dated Oct. 21, 2015.
USPTO Final Office Action for U.S. Appl. No. 14/067,143 dated Aug. 12, 2015.
USPTO Final Office Action for U.S. Appl. No. 14/098,198 dated Jun. 19, 2015.
USPTO Office Action for U.S. Appl. No. 14/090,573 dated Jun. 12, 2015.
USPTO Final Office Action for U.S. Appl. No. 14/478,869 dated Jun. 17, 2015.
USPTO Office Action for U.S. Appl. No. 14/019,730 dated Jun. 3, 2015.
USPTO Office Action for U.S. Appl. No. 14/048,486 dated Aug. 17, 2015.
USPTO Office Action for U.S. Appl. No. 14/048,463 dated Sep. 9, 2015.
USPTO Office Action for U.S. Appl. No. 14/478,813 dated Sep. 10, 2015.
USPTO Final Office Action for U.S. Appl. No. 14/019,730 dated Sep. 23, 2015.
International Search Report and Written Opinion for PCT/US2014/021837 dated Jun. 23, 2015.
International Search Report and Written Opinion for PCT/US2015/017564 dated Jun. 6, 2015.
International Search Report and Written Opinion for PCT/US2015/019709 dated May 22, 2015.
USPTO Office Action for U.S. Appl. No. 14/478,869 dated Feb. 26, 2015.
USPTO Office Action for U.S. Appl. No. 14/098,198 dated Nov. 20, 2014.
USPTO Office Action for U.S. Appl. No. 14/067,143 dated Mar. 12, 2015.
International Search Report and Written Opinion for PCT/US2014/054791 dated Sep. 9, 2014.
International Search Report and Written Opinion for PCT/US2014/054799 dated Sep. 9, 2014.
International Search Report and Written Opinion for PCT/US2014/054497dated Sep. 8, 2014.
International Search Report and Written Opinion for PCT/US2014/054794 dated Sep. 9, 2014.
Shaefer et al., "Utilizing 'Over-Seas" Technology Improves the Cementing Processes in the DJ Basin of Colorado, SPE 80940, pp. 1-8, SPE, Inc., 2003.
International Search Report and Written Opinion for PCT/US2014/054380 dated Sep. 5, 2014.
International Search Report and Written Opinion for PCT/US2014/067112 dated Mar. 5, 2015.
International Search Report and Written Opinion for PCT/US2014/068804 dated Mar. 17, 2015.
USPTO Notice of Allowance for U.S. Appl. No. 13/417,001 dated Mar. 9, 2012.
International Search Report and Written Opinion for PCT/US2014/032150 dated Aug. 21, 2014.
USPTO Office Action for U.S. Appl. No. 13/417,001 dated Apr. 16, 2014.
Benge, O.G. et al. "Evaluation of Blast Furnace Slag Slurried for Oilfield Application" SPE 27449, pp. 169-180, SPE Inc., 1994.
Allahverdi A. et al., (2006). "Chemical activation and set acceleration of lime-natural pozzolan cement." Ceramics-Silikality, 193-199.
Brito, A, et al., (2003). "High surface area support, catalyst derived from natural pumice." Study of pretreatment variables. Ind/ Eng. Chem. Res., 443 1659-1664.
Johnson, C.D. et al., (2007). "Zeolitisation of pumice-microporous materials on macroporous support structures derived from natural minerals." J. Mat. Chem., 17, 476-484.
Mielenz, R.C. et al., (1950), "Effect of calcination on natural pozzolans." Symposium on use of pozzolanic materials in mortars and concretes (pp. 43-92). ASTM.
Ottana, R. et al., (1982). "Hydrothermal synthesis of zeolites form pumice in alkaline and saline environment." Zeolites, 2, 295-298.
Palomo, A. et al., (2011). "Alkaline activation, procedure for transforming fly ash into new materials. Part 1: Applicaitons." World of Coal ASh (WOCA) Conference (pp. 1-14). Denver, CO.
Pisklak, T.J. et al., (2004). "Preparation and characterization of mordenite thin fils via pulsed laster deposition." Journal of Porous Materials, 11(2), 191-209.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). "Zeolitization of pumice in ash-sodium salt solutions." Mat. Chem. Phys., 8, 207-216.
Shi, C. (2001). "An overview on the activation reactivity of natural pozzolans." Can J. Civ. Eng., 778-786.
Shvarzman, A. et al., (2001). Influence of chemical and phase composition of mineral admixtures on their pozzolanic activity.: Advances in Cement Research, 13(1), 1-7.
Ramy N.Edi, Liquid Cement: Changing the Paradigm, Society of Petroleum Engineers, Apr. 15, 2007.
PCT Search Report and Written Opinion for PCT/US2013/023489 dated Apr. 19, 2013.
Benge et al., "Deep Gas-Well Cementaton: A Review fo Risks and Design Basis for Use of a Liquid Cement Premix for Large Offshore Cementing Operations", IADC/SPE 98970, pp. 1-5, IADC/SPE Drilling Conference, 2006.
Rae et al., "Liquid Cement Premix Introduces New Solutions to Conventional Cementing Problems", IADC/SPE 35086, pp. 393-400, IADC/SPE Drilling Conference, 1996.

(56) References Cited

OTHER PUBLICATIONS

Rae et al., "Liquid Cement Premix for Improved Abandonment and Workover Operations". SPE 36477, pp. 637-643, SPE, Inc., 1996.
Anderson et al., "New Technology Improves Cement Slurry Design", SPE 36973, pp. 127-136, SPE Ince., 1996.
How Microsilica Improves Concrete, Publication #C850327. Copyright 1985, The Aberdeen Group.
Non-final Rejection for U.S. Appl. No. 15/087,961 dated Apr. 17, 2017.
Non-final Rejection for U.S. Appl. No. 15/162,245 dated Apr. 21, 2017.

\* cited by examiner

CEMENT SET ACTIVATORS FOR SET-DELAYED CEMENT COMPOSITIONS AND ASSOCIATED METHODS

CROSS REFERENCE TO RELATED APPLICATIONS

The present application is a divisional of application Ser. No. 13/854,115 issued as U.S. Pat. No. 9,227,872 which is a continuation-in-part of application Ser. No. 13/417,001 issued as U.S. Pat. No. 8,851,173.

BACKGROUND

The present invention relates to subterranean cementing operations and, more particularly, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, set-delayed cement compositions have been used. Set-delayed cement compositions are characterized by remaining in a pumpable fluid state for an extended period of time (e.g., at least about 1 day to about 2 weeks or more). When desired for use, the set-delayed cement compositions should be capable of being activated whereby reasonable compressive strengths are developed. For example, a cement set activator may be added to a set-delayed cement composition whereby the composition sets into a hardened mass. Among other things, the set-delayed cement composition may be suitable for use in well bore applications, for example, where it is desired to prepare the cement composition in advance. This may allow, for example, the cement composition to be stored prior to its use. In addition, this may allow, for example, the cement composition to be prepared at a convenient location and then transported to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures. In addition, it may be problematic to activate some set-delayed cement compositions while maintaining acceptable thickening times and compressive strength development.

SUMMARY

An embodiment discloses a method of cementing in a subterranean formation, comprising: providing a set-delayed cement composition comprising water, pumice, hydrated lime, and a set retarder; activating the set-delayed cement composition with a cement set activator, wherein the cement set activator comprises at least one activator selected from the group consisting of nanosilica, a polyphosphate, and combinations thereof; introducing the set-delayed cement composition into a subterranean formation; and allowing the set-delayed cement composition to set in the subterranean formation.

Another embodiment discloses a method for activating a set-delayed cement composition comprising: providing a set-delayed cement composition comprising pumice, hydrated lime in an amount of about 10% to about 30% by weight of the pumice, a set retarder in an amount of about 1% to about 5% by weight of the pumice, and water in an amount of about 35% to about 70% by weight of the pumice; storing the set-delayed cement composition for a period of at least about 1 day; activating the set-delayed cement composition with a cement set activator, wherein the cement set activator comprises a polyphosphate and an additive selected from the group consisting of nanosilica and a monovalent salt; introducing the set-delayed cement composition into an annulus between a conduit disposed in a well bore and a wall of the well bore or another conduit; and allowing the set-delayed cement composition to set in the annulus.

Yet another embodiment discloses an activated set-delayed cement composition comprising: water; pumice; hydrated lime; a set retarder; and a cement set activator, wherein the cement set activator comprises at least one activator selected from the group consisting of nanosilica, a polyphosphate, and combinations thereof.

Yet another embodiment discloses a cementing system comprising mixing equipment for mixing an activated set-delayed cement composition, the activated set-delayed cement composition comprising water, pumice, hydrated lime, a set retarder, and, a cement set activator, wherein the cement set activator comprises at least one activator selected from the group consisting of nanosilica, a polyphosphate, and combinations thereof. The cementing system may further comprise pumping equipment for delivering the set-delayed cement composition into a well bore.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean cementing operations and, more particularly, in certain embodiments, to set-delayed cement compositions and methods of using set-delayed cement compositions in subterranean formations. In particular embodiments, the present invention provides improved cement set activators for activation of set-delayed cement compositions. Embodiments of the cement set activators may be used to activate a set-delayed cement composition while achieving desirable thickening times and compressive strength development.

Embodiments of the set-delayed cement compositions of the present invention may generally comprise water, pumice, hydrated lime, and a set retarder. Optionally, the set-delayed cement compositions may further comprise a dispersant. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable compressive strengths after activation at relatively low temperatures.

The water used in embodiments of the set-delayed cement compositions of the present invention may be from any source provided that it does not contain an excess of compounds that may undesirably affect other components in the set-delayed cement compositions. For example, a set-delayed cement composition may comprise fresh water or salt water. Salt water generally may include one or more dissolved salts therein and may be saturated or unsaturated as desired for a particular application. Seawater or brines may be suitable for use in embodiments of the present invention. Further, the water may be present in an amount sufficient to form a pumpable slurry. In certain embodiments, the water may be present in the set-delayed cement composition in an amount in the range of from about 33% to about 200% by weight of the pumice. In certain embodiments, the water may be present in the set-delayed cement compositions in an amount in the range of from about 35% to about 70% by weight of the pumice. One of ordinary skill in the art with the benefit of this disclosure will recognize the appropriate amount of water for a chosen application.

Embodiments of the set-delayed cement compositions may comprise pumice. Generally, pumice is a volcanic rock that can exhibit cementitious properties, in that it may set and harden in the presence of hydrated lime and water. The pumice may also be ground, for example. Generally, the pumice may have any particle size distribution as desired for a particular application. In certain embodiments, the pumice may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the pumice may have a mean particle size in a range of from about 1 micron to about 200 micron, from about 5 microns to about 100 microns, or from about 10 micron to about 50 microns. In one particular embodiment, the pumice may have a mean particle size of less than about 15 microns. An example of a suitable pumice is available from Hess Pumice Products, Inc., Malad, Id., as DS-325 lightweight aggregate, having a particle size of less than about 15 microns. It should be appreciated that particle sizes too small may have mixability problems while particle sizes too large may not be effectively suspended in the compositions. One of ordinary skill in the art, with the benefit of this disclosure, should be able to select a particle size for the pumice suitable for use for a chosen application.

Embodiments of the set-delayed cement compositions may comprise hydrated lime. As used herein, the term "hydrated lime" will be understood to mean calcium hydroxide. The hydrated lime may be included in embodiments of the set-delayed cement compositions, for example, to form a hydraulic composition with the pumice. For example, the hydrated lime may be included in a pumice-to-hydrated-lime weight ratio of about 10:1 to about 1:1 or a ratio of about 3:1 to about 5:1. Where present, the hydrated lime may be included in the set-delayed cement compositions in an amount in the range of from about 10% to about 100% by weight of the pumice, for example. In some embodiments, the hydrated lime may be present in an amount ranging between any of and/or including any of about 10%, about 20%, about 40%, about 60%, about 80%, or about 100% by weight of the pumice. In some embodiments, the cementitious components present in the set-delayed cement composition may consist essentially of the pumice and the hydrated lime. For example, the cementitious components may primarily comprise the pumice and the hydrated lime without any additional components (e.g., Portland cement, fly ash, slag cement) that hydraulically set in the presence of water. One of ordinary skill in the art, with the benefit of this disclosure, will recognize the appropriate amount of the hydrated lime to include for a chosen application.

Embodiments of the set-delayed cement compositions may comprise a set retarder. A broad variety of set retarders may be suitable for use in the set-delayed cement compositions useful in the present invention. For example, the set retarder may comprise a phosphates, a phosphonic acid, phosphonic acid derivatives, phosphonates, lignosulfonates, salts, organic acids, carboxymethylated hydroxyethylated celluloses, synthetic co- or ter-polymers comprising sulfonate and carboxylic acid groups, borate compounds, derivatives thereof, or mixtures thereof. In certain embodiments, the set retarders used in the set-delayed cement compositions useful in the present invention are phosphonic acid derivatives, such as methylene phosphonic acid derivatives as described in U.S. Pat. No. 4,676,832, the disclosure of which is incorporated herein by reference. Examples of suitable set retarders include, among others, methylene phosphonates such as Micro Matrix® cement retarder (MMCR) available from Halliburton Energy Services, Inc., of Duncan, Okla., as), Dequest® 2006 additive, and Dequest® 2066 additive. Dequest® 2006 additive, and Dequest® 2066 additive are both available from Thermphos, North America/Italmatch Chemicals. Dequest® 2066 additive is a pH neutralized diethylenetriaminepentamethylenephosphonate. Dequest® 2006 additive is nitrilotrismethylenetriphosphonate. Dequest® 2066 additive may be the stronger of the two Dequest® additives in certain systems. In some embodiments, methylene phosphonates and/or methylene phosphonic acid derivatives may be used to retard the pumice-containing compositions disclosed herein for extended periods of time. One of the many advantages of the embodiments of the present invention is that these stronger cement retarders may be successfully used with the cement set activators discussed later. Generally, the set retarder may be present in the set-delayed cement composition used in the present invention in an amount sufficient to delay the setting for a desired time. In some embodiments, the set retarder may be present in the set-delayed cement compositions in an amount in the range of from about 0.01% to about 10% by weight of the pumice. In specific embodiments, the set retarder may be present in an amount ranging between any of and/or including any of about 0.01%, about 0.1%, about 1%, about 2%, about 4%, about 6%, about 8%, or about 10% by weight of the pumice. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants and polycarboxylated ether dispersants. One example of a suitable sulfonated-formaldehyde-based dispersant that may be suitable is a sulfonated acetone formaldehyde condensate, available from Halliburton Energy Services, Inc., as CFR™-3 dispersant. Examples of suitable polycarboxylated ether dispersants include Liquiment® 514L and 5581F dispersants (available from BASF Corporation, Houston, Tex.) and Coatex dispersants (available from Coatex Inc.). While a variety of dispersants may be used in accordance with embodiments of the present invention, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pumice and hydrated lime in the composition for an extended period of time.

In some embodiments, the dispersant may be included in the set-delayed cement compositions in an amount in the range of from about 0.01% to about 5% by weight of the pumice. In specific embodiments, the dispersant may be present in an amount ranging between any of and/or including any of about 0.01%, about 0.1%, about 0.5%, about 1%, about 2%, about 3%, about 4%, or about 5% by weight of the pumice. One of ordinary skill in the art, with the benefit of this disclosure, will recognize the appropriate amount of the dispersant to include for a chosen application.

Other additives suitable for use in subterranean cementing operations also may be included in embodiments of the set-delayed cement compositions. Examples of such additives include, but are not limited to, weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement composition after storing but prior to placement of the set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions of the present invention generally should have a density suitable for a particular application. By way of example, the set-delayed cement compositions may have a density in the range of from about 4 pounds per gallon ("lb/gal") to about 20 lb/gal. In certain embodiments, the set-delayed cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storing the composition, but prior to placement in a subterranean formation. Those of ordinary skill in the art, with the benefit of this disclosure, will recognize the appropriate density for a particular application.

As previously mentioned, the set-delayed cement compositions may have a delayed set in that they remain in a pumpable fluid state for an extended period of time. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a high-temperature high-pressure consistometer at room temperature (e.g., about 80° F.) in accordance with the procedure for determining cement thickening times set forth in API RP Practice 10B-2, *Recommended Practice for Testing Well Cements*, First Edition, July 2005. As set forth in Example 4 below, an example composition was prepared that comprised pumice, 20% hydrated lime, 1.4% dispersant (Liquiment® 514L), 1.26% set retarder (Micro Matrix® cement retarder), and 62% water (all % by weight of pumice). After 45 days of storage at ambient conditions, the example composition was mixed with 6% calcium chloride by weight of the pumice. At 140° F., the example composition had a thickening time (time to 70 Bc) of 2 hours and 36 minutes and developed 50 psi compressive strength in 9 hours and 6 minutes as measured on an Ultrasonic Cement Analyzer ("UCA"), available from Fann Instrument Company, Houston, Tex., while maintained at 3000 psi. After 48 hours, the sample was crushed and had a compressive strength of 2,240 psi.

When desired for use, embodiments of the set-delayed cement compositions may be activated (e.g., by combination with a cement set activator) to thereby set into a hardened mass. The term "cement set activator" or "activator", as used herein, refers to an additive that activates a set-delayed or heavily retarded cement composition and may also accelerate the setting of the set-delayed or heavily retarded cement. By way of example, embodiments of the set-delayed cement compositions may be activated to set to form a hardened mass in a time period in the range of from about 2 hours to about 12 hours. For example, embodiments of the set-delayed cement compositions may set to form a hardened mass in a time period ranging between any of and/or including any of about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann Instrument Company, Houston, Tex. Compressive strengths may be determined in accordance with API RP 10B-2, *Recommended Practice for Testing Well Cements*, First Edition, July 2005.

By way of example, the set-delayed cement composition, may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement composition may develop a compressive strength in 24 hours of at least about 50 psi, at least about 100 psi, at least about 500 psi, or more. In some embodiments, the compressive strength values may be determined using a UCA at temperature ranging from 100° F. to 200° F. while maintained at 3000 psi.

In some embodiments, the set-delayed cement composition may have a desirable thickening time after activation. Thickening time typically refers to the time a fluid, such as a cement composition, remains in a fluid state capable of being pumped. A number of different laboratory techniques may be used to measure thickening time to give an indication of the amount of time a treatment fluid will remain pumpable in a well. An example technique for determining whether a treatment fluid is in a pumpable fluid state may use a high-temperature high-pressure consistometer at specified pressure and temperature conditions, in accordance with the procedure for determining cement thickening times set forth in the afore-mentioned API RP Practice 10B-2. The thickening time may be the time for the treatment fluid to reach 70 Bearden units of consistency ("Bc") and may be reported in time to reach 70 Bc. In some embodiments, the set-delayed cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments of the present invention may include addition of a cement set activator to the set-delayed cement compositions. Examples of suitable cement set activators include, but are not limited to, calcium chloride, triethanolamine, sodium silicate, zinc formate, calcium acetate, sodium hydroxide, sodium sulfate, and combinations thereof. An additional example of a suitable cement set activator includes nanosilica. Yet another example of a suitable cement activator includes a polyphosphate. It has been found that the combination of the nanosilica and the polyphosphate may be used to activate embodiments of the set-delayed cement compositions. Additionally, the combination of the polyphosphate and a monovalent salt has proven to be a particularly effective cement set activator in accordance with embodiments of the present invention. Advantageously, set-delayed cement compositions activated with the nanosilica, a polyphosphate, the combination of a nanosilica and a polyphosphate, or the combination of a polyphosphate and a monovalent salt may have acceptable thickening times and/or compressive strength development. Moreover the activators or combinations of activators of the preceding sentence may exhibit better results, as compared to other activators such as calcium chloride, in compositions comprising heavily retarded cement compositions such as compositions using methylene phosphonates and/or methylene phosphonic acid derivatives as discussed above.

Embodiments of the present invention may include a cement set activator comprising nanosilica. As used herein, the term "nanosilica" refers to silica having a particle size of less than or equal to about 100 nanometers ("nm"). The size of the nanosilica may be measured using any suitable technique. It should be understood that the measured size of the nanosilica may vary based on measurement technique, sample preparation, and sample conditions such as temperature, concentration, etc. One technique for measuring particle size of the nanosilica is Transmission Electron Microscope (TEM) observation. An example of a suitable commercially available technique based on laser diffraction technique may use a Zetasizer Nano ZS supplied by Malvern Instruments, Worcerstershire, UK. In some embodiments, the nanosilica may comprise colloidal nanosilica. The nanosilica may also be stabilized using any suitable technique. In some embodiments, the nanosilica may be stabilized with a metal oxide, such as lithium oxide, sodium oxide, potassium oxide, and/or a combination thereof. Additionally the nanosilica may be stabilized with an amine and/or a metal oxide as mentioned above. Embodiments of the nanosilicas have an additional advantage in that they have been known to fill in pore space in cements which can result in superior mechanical properties in the cement after the cement has set.

Embodiments of the present invention may include a cement set activator comprising a combination of a monovalent salt and a polyphosphate. The monovalent salt and the polyphosphate may be combined prior to addition to the set-delayed cement composition or may be separately added to the set-delayed cement composition. The monovalent salt used may be any salt that dissociates to form a monovalent cation, such as sodium and potassium salts. Specific examples of suitable monovalent salts include potassium sulfate, calcium chloride, and sodium sulfate. A variety of different polyphosphates may be used in combination with the monovalent salt for activation of the set-delayed cement compositions, including polymeric metaphosphate salts, phosphate salts, and combinations thereof, for example. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. Interestingly, sodium hexametaphosphate is also known in the art to be a strong retarder of Portland cements. Because of the unique chemistry of polyphosphates, polyphosphates may be used as a cement set activator for embodiments of the set-delayed cement compositions disclosed herein. The ratio of the monovalent salt to the polyphosphate may range, for example, from about 2:1 to about 1:25 or from about 1:1 to about 1:10. Embodiments of the cement set activator may comprise the monovalent salt and the polyphosphate salt in a ratio (monovalent salt to polyphosphate) ranging between any of and/or including any of about 5:1, 2:1, about 1:1, about 1:2, about 1:5, about 1:10, about 1:20, or about 1:25.

In some embodiments, the combination of the monovalent salt and the polyphosphate may be provided as a liquid additive that may be used for activation of a set-delayed cement composition. The liquid additive may comprise water, the monovalent salt, the polyphosphate and a dispersant. Examples of suitable dispersants include, without limitation, sulfonated-formaldehyde-based dispersants and polycarboxylated ether dispersants. One example of a suitable sulfonated-formaldehyde-based dispersant is a sulfonated acetone formaldehyde condensate, available from Halliburton Energy Services, Inc., as CFR™-3 dispersant.

One example of a suitable polycarboxylated ether dispersant is Liquiment® 514L or 5581F dispersants, available from BASF Corporation, Houston, Tex. The dispersant may be included in the liquid additive in an amount from about 0.2% to 8% about by weight of the liquid additive. The water may be included in the liquid additive in an amount from about 90% to about 99.9% by weight of the liquid additive. The combination of the monovalent salt and the polyphosphate may range from about 0.1% to about 2.5% by weight of the liquid additive.

Without being limited by theory, a description of a mechanism for activation of a lime and pozzolan set-delayed cement composition using a set-delayed cement activator comprising a combination of sodium sulfate and sodium hexametaphosphate is provided. It is believed that the sodium sulfate produces sodium hydroxide upon reaction with the lime. This reaction causes a resulting rise in the pH of the slurry and consequently an increase in the rate of dissolution of silicon dioxide. Cement hydration rate has a direct relationship with the proportion of free silicates and/or aluminosilicates. Sodium hexametaphosphate chelates and increases the dissolution rate of calcium hydroxide. The combination of sodium sulfate and sodium hexametaphosphate creates a synergy in various compositions of set-delayed cement compositions that provides better results than the singular use of either cement set activator.

The cement set activator should be added to embodiments of the set-delayed cement composition in an amount sufficient to activate the extended settable composition to set into a hardened mass. In certain embodiments, the cement set activator may be added to the set-delayed cement composition in an amount in the range of about 0.1% to about 20% by weight of the pumice. In specific embodiments, the cement set activator may be present in an amount ranging between any of and/or including any of about 0.1%, about 1%, about 5%, about 10%, about 15%, or about 20% by weight of the pumice. One of ordinary skill in the art, with the benefit of this disclosure, will recognize the appropriate amount of the cement set activator to include for a chosen application.

As will be appreciated by those of ordinary skill in the art, embodiments of the set-delayed cement compositions of the present invention may be used in a variety of subterranean operations, including primary and remedial cementing. In some embodiments, a set-delayed cement composition may be provided that comprises water, pumice, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a well bore drilled into the subterranean formation, into a near well bore region surrounding the well bore, or into both. Embodiments of the present invention may further include activation of the set-delayed cement composition. The activation of the set-delayed cement composition may comprise, for example, addition of a cement set activator to the set-delayed cement composition. The cement set activator may be added to the set-delayed cement composition prior to introduction into the subterranean formation.

In some embodiments, a set-delayed cement composition may be provided that comprises water, pumice, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be activated and introduced into a space between a conduit (e.g., pipe strings, liners) located in the well bore and a wall of the well bore (or another conduit), the well bore penetrating the subterranean formation. The set-delayed cement composition may be allowed to set to form an annular sheath of hardened cement in the space between the conduit and the well bore wall (or the other conduit). Among other things, the set cement composition may form a barrier, preventing the migration of fluids in the well bore. The set cement composition also may, for example, support the conduit in the well bore.

In remedial cementing embodiments, a set-delayed cement composition may be used, for example, in squeeze-cementing operations or in the placement of cement plugs. By way of example, the set-delayed composition may be activated and placed in a well bore to plug an opening, such as a void or crack, in the formation, in a gravel pack, in the conduit, in the cement sheath, and/or a microannulus between the cement sheath and the conduit.

The exemplary set-delayed cement compositions disclosed herein may directly or indirectly affect one or more components or pieces of equipment associated with the preparation, delivery, recapture, recycling, reuse, and/or disposal of the disclosed set-delayed cement compositions. For example, the disclosed set-delayed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary set-delayed cement compositions. The disclosed set-delayed cement compositions may also directly or indirectly affect any transport or delivery equipment used to convey the set-delayed cement compositions to a well site or downhole such as, for example, any transport vessels, conduits, pipelines, trucks, tubulars, and/or pipes used to compositionally move the set-delayed cement compositions from one location to another, any pumps, compressors, or motors (e.g., topside or downhole) used to drive the set-delayed cement compositions into motion, any valves or related joints used to regulate the pressure or flow rate of the set-delayed cement compositions, and any sensors (i.e., pressure and temperature), gauges, and/or combinations thereof, and the like. The disclosed set-delayed cement compositions may also directly or indirectly affect the various downhole equipment and tools that may come into contact with the set-delayed cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present invention, the following examples of certain aspects of some embodiments are given. In no way should the following examples be read to limit, or define, the entire scope of the invention.

Example 1

The following series of tests was performed to evaluate the force resistance properties of comparative cement compositions comprising pumice and hydrated lime. Three different comparative sample settable compositions, designated Samples 1-3, were prepared using pumice (DS-325 lightweight aggregate), hydrated lime, Liquiment® 514L dispersant, and water, as indicated in the table below. After preparation, the samples were placed in an UCA and cured at 140° F. and 3,000 psi for 24 hours. The cured cement was then removed from the UCA and crushed to yield the compressive strength values provided in Table 1 below.

TABLE 1

Compressive Strength Tests

| Sample | | 1 | 2 | 3 |
|---|---|---|---|---|
| Density | lb/gal | 14.3 | 14.3 | 14.3 |
| Pumice:Lime Wt Ratio | | 3:1 | 4:1 | 5:1 |
| Pumice | g | 400 | 400 | 500 |
| Lime | g | 134 | 103 | 100 |
| Dispersant | g | 12 | 4 | 13 |
| Water | g | 196 | 187 | 220 |
| 24-Hr Crush Strength | psi | 2,240 | 1900 | 1960 |

Example 1 thus indicates that cement compositions that comprise pumice and lime in a weight ratio ranging from 3:1 to 5:1 may develop compressive strengths suitable for particular applications.

Example 2

A sample set-delayed cement composition, designated Sample 4, having a density of 13.3 lb/gal was prepared that comprised 500 grams of pumice (DS-325 lightweight aggregate), 100 grams of hydrated lime, 13 grams of Liquiment® 514L dispersant, 24 grams of Micro Matrix® cement retarder, and 300 grams of water. The rheological properties of the sample were measured after storing at room temperature and pressure for periods of 1 day and 6 days. After preparation, the rheological properties of the sample were determined at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 2

Viscosity Tests

| Age of Sample | Fann Readings | | | | | | Yield Point | Plastic Viscosity |
|---|---|---|---|---|---|---|---|---|
| (days) | 600 | 300 | 200 | 100 | 6 | 3 | (lb/100 ft²) | (centipoise) |
| 1 | 560 | 322 | 244 | 170 | 46 | 38 | 84 | 238 |
| 6 | 498 | 310 | 228 | 136 | 24 | 20 | 122 | 188 |

Example 2 thus indicates that set-delayed cement compositions that comprise pumice, hydrated lime, a dispersant, a set retarder, and water can remain fluid after 6 days.

Example 3

A sample set-delayed cement composition, designated Sample 5, having a density of 13.4 lb/gal was prepared that comprised 500 grams of pumice (DS-325 lightweight aggregate), 100 grams of hydrated lime, 7 grams of Liquiment® 514L dispersant, 6.3 grams of Micro Matrix® cement retarder, and 304 grams of water. The rheological properties of the sample were measured after storing at room temperature and pressure for periods of from 1 day to 19 days. The rheological properties were measured at room temperature (e.g., about 80° F.) using a Model 35A Fann Viscometer and a No. 2 spring, in accordance with the procedure set forth in API RP Practice 10B-2, *Recommended Practice for Testing Well Cements*. The results of this test are set forth in the table below.

TABLE 3

Viscosity Tests

| Age of Sample | Fann Readings | | | | |
|---|---|---|---|---|---|
| (Days) | 300 | 200 | 100 | 6 | 3 |
| 1 | 462 | 300 | 130 | 12 | 8 |
| 2 | 458 | 282 | 122 | 6 | 4 |
| 5 | 420 | 260 | 106 | 3 | 2 |
| 8 | 446 | 270 | 110 | 4 | 1 |
| 12 | 420 | 252 | 100 | 3 | 2 |
| 19 | 426 | 248 | 94 | 2 | 1 |

After 7 days, calcium chloride in the amount indicated in Table 4 below was added to a separately prepared sample of the same formulation as above. The sample was then placed in an UCA and the initial setting time, which is the time for the composition to reach a compressive strength of 50 psi while maintained at 3,000 psi was determined in accordance with API RP Practice 10B-2, *Recommended Practice for Testing Well Cements*. The initial setting time of the sample was also determined without addition of the calcium chloride. The samples with and without the calcium chloride were heated to a temperature of 140° F. in 30 minutes and then maintained at that temperature throughout the test.

TABLE 4

Compressive Strength Tests

| Age of Sample (Days) | Test Temperature (° F.) | CaCl₂ (% by wt of Pumice & Lime) | Initial Setting Time (hr:min) |
|---|---|---|---|
| 7 | 140 | 0 | no set after 4 days |
| 7 | 140 | 10 | 5:11 |

Example 3 thus indicates that the set-delayed cement compositions that comprise pumice, hydrated lime, a dispersant, a set retarder, and water will not set for a period of at least 19 days at ambient temperature and over 4 days at 140° F. Example 3 further indicates that sample set-delayed cement compositions may be activated at a desired time by addition of a suitable activator.

Example 4

A sample set-delayed cement composition, designated Sample 6, having a density of 13.4 lb/gal was prepared that comprised pumice (DS-325 lightweight aggregate), 20% hydrated lime, 1.4% Liquiment® 514L dispersant, 1.26% Micro Matrix® cement retarder, and 62% of water (all by weight of pumice, referred to in the table below as "% bwop"). After 45 days in storage at ambient conditions, the sample was mixed with 6% calcium chloride. At 140° F., the sample had a thickening time (time to 70 Bc) of 2 hours and 36 minutes and an initial setting time (time to 50 psi) of 9 hours and 6 minutes as measured using an UCA while maintained at 3000 psi. After 48 hours, the sample was crushed with a mechanical press which gave a compressive strength of 2,240 psi. The thickening time and initial setting time were both determined in accordance with API RP Practice 10B-2, *Recommended Practice for Testing Well Cements*. The results of this test are set forth in the table below.

TABLE 5

| Age of Sample (Days) | Test Temperature (° F.) | Calcium Chloride (% bwop) | Thickening Time to 70 Bc (hr:min) | Initial Setting Time (hr:min) | 48 Hr Crush Strength (psi) |
|---|---|---|---|---|---|
| 45 | 140 | 6 | 2:36 | 9:36 | 2,240 |

Example 4 thus indicates that the set-delayed cement compositions that comprise pumice, hydrated lime, a dispersant, a set retarder, and water will not set for a period of at least 45 days at ambient temperature. Example 4 further indicates that sample set-delayed cement compositions may be activated at a desired time by addition of a suitable activator.

Example 5

This example was performed to evaluate the ability of sodium hydroxide and sodium sulfate to activate a set-delayed cement composition that comprised pumice (DS-325 lightweight aggregate), hydrated lime, Liquiment® 514L dispersant, Micro Matrix® cement retarder, and water. Four sample set-delayed cement compositions, designated Samples 7-10, were prepared having concentrations of components as indicated in the table below. The samples were monitored via an UCA. After the samples were placed in the UCA, the pressure was increased to 3,000 psi, and the temperature was increased to 100° F. over a 15-minute time period and held for the duration of the test. A portion of the slurry was retained and poured into a plastic cylinder to monitor the slurry behavior at room temperature and pressure. These procedures were repeated for all samples.

Sample 7 was monitored for 72 hours over which time no strength was developed and the slurry was still pourable when removed from the UCA. The portion kept at room temperature and pressure was likewise still pourable after 72 hours.

Sample 8 was prepared using the same slurry design as Sample 7 except that sodium hydroxide was added as an activator. The sodium hydroxide was added in solid form directly to the mixing jar that contained the prepared sample. As can be seen from Table 6, Sample 8, reached 50 psi of compressive strength at 16 hours and 36 minutes. The strength continued to build, reaching a maximum of 1,300 psi, when the test was stopped at 72 hours. The cured cement was removed from the UCA and crushed with a mechanical press which gave a compressive strength of 969 psi. The portion kept at room temperature and pressure was crushed after 7 days resulting in a compressive strength of 143 psi.

Sample 9 was prepared using the same slurry design as Sample 8 except that sodium sulfate was added as an activator. The sodium sulfate was added in solid form directly to the mixing jar that contained the prepared slurry. Sample 9 reached 50 psi of compressive strength at 67 hours and 29 minutes. The strength continued to build, slowly, reaching a maximum of 78 psi, when the test was stopped at 72 hours. The cured cement was removed from the UCA and crushed with a mechanical press which gave a compressive strength of 68.9 psi. The portion kept at room temperature and pressure was still too soft to be crushed after 7 days.

Sample 10 was prepared using the same slurry design as Sample 8 except that equal amounts of sodium hydroxide and sodium sulfate were added as an activator. The sodium hydroxide and sodium sulfate were added in solid form directly to the mixing jar that contained the prepared slurry. Sample 10 reached 50 psi of compressive strength at 22 hours and 40 minutes. The strength continued to build, reaching a maximum of 900 psi, when the test was stopped at 72 hours. The cured cement was removed from the UCA and crushed with a mechanical press which gave a compressive strength of 786 psi. The portion kept at room temperature and pressure was crushed after 7 days resulting in a compressive strength of 47.9 psi.

The results of these tests are set forth in the table below. The abbreviation "% bwop" refers to the percent of the component by weight of the pumice. The abbreviation "gal/sk" refers to gallons of the component per 46-pound sack of the pumice. The abbreviation "RTP" refers to room temperature and pressure.

TABLE 6

| Sample | | 7 | 8 | 9 | 10 |
|---|---|---|---|---|---|
| Density | lb/gal | 13.38 | 13.38 | 13.38 | 13.38 |
| Water | % bwop | 61.97 | 63.60 | 64.62 | 64.11 |
| Pumice | % bwop | 100 | 100 | 100 | 100 |
| Hydrated Lime | % bwop | 20 | 20 | 20 | 20 |
| Dispersant | gal/sk | 0.07 | 0.07 | 0.07 | 0.07 |
| Set Retarder | % bwop | 0.06 | 0.06 | 0.06 | 0.06 |
| Sodium Hydroxide | % bwop | — | 4 | — | 2 |
| Sodium Sulfate | % bwop | — | — | 4 | 2 |
| UCA | | | | | |
| Temp/Press | F./Psi | 100/3000 | 100/3000 | 100/3000 | 100/3000 |
| Initial Set (50 psi) | hr:min | >78 | 16:36 | 67:29 | 22:40 |
| Final Set (100 psi) | hr:min | — | 21:08 | — | 32:44 |
| 24 Hr Comp. Strength | psi | — | 138.74 | — | 59.60 |
| 48 Hr Comp. Strength | psi | — | 711.35 | — | 331.48 |
| 72 Hr Comp. Strength | psi | — | 1300 | 78 | 900 |

TABLE 6-continued

| Sample | | 7 | 8 | 9 | 10 |
|---|---|---|---|---|---|
| 72 Hr Crush Strength (UCA) | psi | — | 969 | 68.90 | 786 |
| 7-Day Crush Strength (RTP) | psi | — | 143.20 | 0.00 | 47.90 |

Example 5 thus indicates that sodium hydroxide, sodium sulfate, and combinations of the two can activate the set-delayed cement compositions, but to varying degrees. The testing showed that both sodium hydroxide and combinations of sodium hydroxide with sodium sulfate activated the cement compositions to an acceptable level. When compared to the non-activated composition, sodium sulfate activated the cement compositions, but much less so than the sodium hydroxide or combination of sodium hydroxide and sodium sulfate.

Example 6

This example was performed to evaluate the effect of sodium sulfate and sodium hexametaphospate on the setting time of a set-delayed cement composition having a density of 13.5 lb/gal that comprised pumice (DS-325 lightweight aggregate), hydrated lime, Liquiment® 5581F dispersant, Micro Matrix® cement retarder, and water. Micro Matrix® cement retarder (MMCR) is a phosphonate cement retarder. Four sample set-delayed cement compositions, designated Samples 11-14, were prepared having concentrations of components as indicated in the table below, based on the percentage of the component by weight of the pumice (% bwop). The samples were cast in 2"×4" cylinders and cured for 24 hours in a water bath. One set of samples (samples 11, 12, and 13) were cured at 100° F. and another set of samples (samples 14, 15, and 16) were cured at 110° F. Uniaxial compression tests we performed on all samples after the 24 hour period.

Samples 11 and 14 were activated using sodium hexametaphosphate. Samples 12 and 15 were activated using a combination of sodium hexametaphosphate and sodium sulfate. Samples 13 and 16 were activated with calcium chloride. The additive was added directly to the mixing jar that contained the prepared sample. As can be seen from Table 7, samples containing the combination of sodium sulfate and sodium hexametaphosphate achieved higher 24-hour compressive strengths than those samples set at the same temperature with only sodium sulfate. This increase in strength observed when sodium sulfate is added, highlights the synergy between sodium sulfate and sodium hexametaphosphate in activating the setting of the extended life cement slurry. Furthermore, when calcium chloride was used to activate the cement there was no compressive strength observed either at 100° F. or 110° F. The cement did not set in either case. This highlights the activating power of sodium hexametaphosphate and the sodium hexametaphosphate and sodium sulfate combination with regards to calcium chloride.

TABLE 7

| | | Sample | | | | | |
|---|---|---|---|---|---|---|---|
| | | 11 | 12 | 13 | 14 | 15 | 16 |
| Set Temperature | ° F. | 100 | 100 | 100 | 110 | 110 | 110 |
| Density | lb/gal | 13.1 | 13.2 | 13.2 | 13.1 | 13.2 | 13.2 |
| Water | % bwop | 70 | 70 | 70 | 70 | 70 | 70 |

TABLE 7-continued

| | | Sample | | | | | |
|---|---|---|---|---|---|---|---|
| | | 11 | 12 | 13 | 14 | 15 | 16 |
| Pumice | % bwop | 100 | 100 | 100 | 100 | 100 | 100 |
| Hydrated Lime | % bwop | 20 | 20 | 20 | 20 | 20 | 20 |
| Dispersant | % bwop | 1.2 | 1.2 | 1.2 | 1.2 | 1.2 | 1.2 |
| Set Retarder (MMCR) | % bwop | 1.3 | 1.3 | 1.3 | 1.3 | 1.3 | 1.3 |
| Sodium Hexametaphosphate | % bwop | 2 | 2 | — | 2 | 2 | — |
| Sodium Sulfate | % bwop | — | 2 | — | — | 2 | — |
| Calcium Chloride | % bwop | — | — | 2 | — | — | 2 |
| 24 hr. Comp. Strength | psi | 0 | 70 | 0 | 205 | 360 | 0 |

Example 6 thus indicates that sodium hexametaphosphate, sodium sulfate, and combinations of the two can activate the set-delayed cement compositions, but to varying degrees. The testing showed that the combination of sodium sulfate and sodium hexametaphosphate activated the cement compositions under conditions were calcium chloride would not effectively activate the cement to set.

Example 7

This example was performed to further evaluate the ability of sodium sulfate and sodium hexametaphospate to activate a set-delayed cement composition having a density of 13.5 lb/gal that comprised pumice (DS-325 lightweight aggregate), hydrated lime, Liquiment® 5581F dispersant, Micro Matrix® cement retarder, and water. Micro Matrix® cement retarder (MMCR) is a phosphonate cement retarder. Five sample set-delayed cement compositions, designated Samples 17-21, were prepared having concentrations of components as indicated in the table below. The thickening times of the samples were both determined in accordance with API RP Practice 10B-2, *Recommended Practice for Testing Well Cements*. The results of this test are set forth in the table below.

Samples 17, 19, and 20 were activated using a combination of sodium hexametaphosphate and sodium sulfate as a liquid additive. The liquid additive was added directly to the mixing jar that contained the prepared sample. The liquid additive comprised sodium hexmetaphosphate (10 g), sodium sulfate (10 g), Liquiment® 5581F dispersant (2.5 g), and water (50 g). Samples 18 and 21 were activated with calcium chloride. As can be seen from Table 8, Sample 17 reached 100 Bc after 5.5 hours whereas Sample 18 (with calcium chloride did not set after 100 hours). Samples 19 and 20 were set at 140° F. These samples had compositions with 2.6 and 5.2% MMCR (% bwop), respectively. They were activated with the sodium sulfate and sodium hexametaphosphate and they gave thickening times of 1 hour and 5.5 hours, respectively. The thickening times of the activated samples was determined at 140° F. in accordance with API RP Practice 10B-2, *Recommended Practice for Testing Well Cements*. The results of this test are set forth in the table below.

TABLE 8

| Sample | | 17 | 18 | 19 | 20 |
|---|---|---|---|---|---|
| Density | lb/gal | 13.2 | 13.2 | 13.2 | 13.1 |
| Temperature | ° F. | 100 | 100 | 140 | 140 |
| Water | % bwop | 70 | 70 | 70 | 70 |
| Pumice | % bwop | 100 | 100 | 100 | 100 |

TABLE 8-continued

| Sample | | 17 | 18 | 19 | 20 |
|---|---|---|---|---|---|
| Hydrated Lime | % bwop | 20 | 20 | 20 | 20 |
| Dispersant | % bwop | 1.2 | 1.2 | 1.2 | 1.2 |
| Set Retarder | % bwop | 1.3 | 1.3 | 2.6 | 5.2 |
| Sodium Hexametaphosphate | % bwop | 2 | — | 2 | 2 |
| Sodium Sulfate | % bwop | 2 | — | 2 | 2 |
| Calcium Chloride | % bwop | — | 2 | — | — |
| Thickening Time to 100 Bc (hr:min) | | 5.5 hours | >100 hours | 1 hour | 5.5 hours |

Example 17, 19, and 20 thus indicate that sodium hexametaphosphate, sodium sulfate, and combinations of the two can activate the set-delayed cement compositions where activation with calcium chloride is inadequate for a phosphonate set retarder such as MMCR was used.

Example 8

This example was performed to evaluate the ability of nanosilica to activate set-delayed cement compositions composition having a density of 13.5 lb/gal that comprised pumice (DS-325 lightweight aggregate), 20% hydrated lime in an amount of, 1.2% Liquiment® 5581F dispersant, 1.3% Micro Matrix® cement retarder, and 60% water (all by weight of pumice). Samples 21-26 were activated with nanosilica stabilized with lithium oxide. The nanosilica stabilized with lithium oxide was a colloidal nanosilica that was approximately 20% active. Samples 21-26 were stabilized with nanosilica stabilized with lithium oxide (LSS-35 from Nissan Chemical), referred to in the table below as Nanosilica A. The nanosilica stabilized with lithium oxide was a colloidal nanosilica that was approximately 20% active. The nanosilica was added directly to the mixing jar containing the prepared sample for each sample. After activation, the thickening times were measured at various temperatures after the addition of varying amounts of lithium stabilized activators. The thickening time was determined in accordance with API RP Practice 10B-2, *Recommended Practice for Testing Well Cements*. The results of this test are set forth in the table below.

TABLE 9

| Sample | Test Temp. ° F. | Activator Type | % bwop | Thickening Time to 70 Bc (hr:min) | Thickening Time to 100 Bc (hr:min) |
|---|---|---|---|---|---|
| 21 | 73 | Nanosilica A | 10 | <00:30 | <00:30 |
| 22 | 80 | Nanosilica A | 8 | 00:35 | 00:35 |
| 23 | 80 | Nanosilica A | 7 | 04:00 | 04:30 |
| 24 | 80 | Nanosilica A | 5.5 | 04:40 | 06:00 |
| 25 | 80 | Nanosilica A | 4 | 14:00 | 22:00 |
| 26 | 110 | Nanosilica A | 6.9 | 00:25 | 00:35 |

Example 8 thus indicates that decreasing the amount of the nanosilica stabilized with lithium oxide added to the slurry leads to increased thickening times.

Example 9

This Example describes an additional combination of activators with a synergetic effect similar to the effect described in Samples 17, 19, and 20. Sample set-delayed cement compositions, designated Samples 27-30, with densities as shown in Table 10, were prepared comprising pumice (DS-325 lightweight aggregate), 20% hydrated lime, 1.2% Liquiment® 5581F dispersant, 2.6% Micro Matrix® cement retarder, and 76% of water (all by weight of pumice). Samples 21-24 all demonstrate synergies between dissimilar activators. Sample 27 uses the activator combination of sodium sulfate and sodium hexametaphosphate (as in Samples 17, 19, and 20). At a set temperature of 140° F., the 24-hour compressive strength of the sample was determined to be 800 psi. LSS-75 is used in sample 28 as a synergetic component to sodium hexametaphosphate (replacing sodium sulfate's role in sample 27). If LSS-75 was added in place of sodium sulfate, the compressive strength is even higher, at 950 psi. LSS-75 is referred to in the table below as Nanosilica B and is a nanosilica stabilized by lithium oxide sold by Nissan Chemical Ltd. The Sample 29 uses a different nanosilica additive supplied by Nissan Chemical. This additive is SNOWTEX-PS-M, referred to in the table below as Nanosilica C. The 24-hour compressive strength of the cement cured in sample 24 cured at 140° F. is 962 psi. Sample 30 illustrates the use of nanosilica as a synergetic additive to sodium hexametaphosphate at lower temperature (110° F.).

TABLE 10

| Sample | | 27 | 28 | 29 | 30 |
|---|---|---|---|---|---|
| Density | lb/gal | 12.89 | 12.71 | 12.85 | 12.71 |
| Temperature | ° F. | 140 | 140 | 140 | 110 |
| Water | % bwop | 76 | 76 | 76 | 76 |
| Pumice | % bwop | 100 | 100 | 100 | 100 |
| Hydrated Lime | % bwop | 20 | 20 | 20 | 20 |
| Dispersant | % bwop | 1.2 | 1.2 | 1.2 | 1.2 |
| Set Retarder | % bwop | 2.6 | 2.6 | 2.6 | 2.6 |
| Sodium Hexametaphosphate | % bwop | 1.9 | 2 | 1.8 | 1.8 |
| Sodium Sulfate | % bwop | 1.8 | — | — | — |
| Nanosilica B | % bwop | — | 5.3 | — | 5.4 |
| Nanosilica C | % bwop | — | — | 5.8 | — |
| 24-hour Compressive Strength | psi | 800 | 948 | 962 | 208 |

Example 10

This example describes the use of different phosphonate retarders and their effects on the 24-hour compressive strength of the activated cement compositions. Dequest® 2006 and Dequest® 2066 additives are in the same phosphonate family of retarders as MMCR. Samples 31 and 32 are described in Table 11. Sample 31 is the sample with Dequest® 2066 additive, whereas Sample 32 is that with Dequest® 2066 additive. They have 24-hour compressive strengths of 452 and 514. This example demonstrates the utility of the combination of sodium hexametaphosphate and sodium sulfate as an activator with other retarders of the phosphonate type.

TABLE 11

| Sample | | 31 | 32 |
|---|---|---|---|
| Density | lb/gal | 13.29 | 13.23 |
| Temperature | ° F. | 140 | 140 |
| Water | % bwop | 62 | 62 |
| Pumice | % bwop | 100 | 100 |
| Hydrated Lime | % bwop | 20 | 20 |
| Dispersant | % bwop | 7 | 7 |
| Phosphonate Set Retarder: Bequest ® 2066 Additive | % bwop | 0.64 | — |

TABLE 11-continued

| Sample | | 31 | 32 |
|---|---|---|---|
| Phosphonate Set Retarder: Dequest ® 2006 Additive | % bwop | — | 1.3 |
| Sodium Hexametaphosphate | % bwop | 1.9 | 2 |
| Sodium Sulfate | % bwop | 1.8 | — |
| 24-hour Compressive Strength | psi | 452 | 514 |

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. An activated set-delayed cement composition comprising:
   water;
   pumice;
   hydrated lime;
   a set retarder selected from the group consisting of diethylenetriaminepentamethylenephosphonate, nitrilotrismethylenetriphosphonate, methylene phosphonates, methylene phosphonic acid derivatives, and combinations thereof; and
   a cement set activator comprising a combination of a polymeric metaphosphate salt and a monovalent salt.

2. The composition of claim 1 wherein the cement set activator is present in the activated set-delayed cement composition in an amount of about 0.1% to about 20% by weight of the activated set-delayed cement composition.

3. The composition of claim 1 wherein the monovalent salt comprises sodium sulfate.

4. The composition of claim 1 wherein a ratio of the monovalent salt to the polymeric metaphosphate salt is from about 2:1 to about 1:25.

5. The composition of claim 1 wherein the activated set-delayed cement composition further comprises a dispersant.

6. The composition of claim 1 wherein the cement set activator further comprises nanosilica, wherein the nanosilica has been stabilized by at least one nanosilica stabilizer selected from the group consisting of: sodium oxide, potassium oxide, lithium oxide, an amine, and any combination thereof.

7. The composition of claim 1 wherein the activated set-delayed cement composition further comprises a polycarboxylated ether dispersant.

8. The composition of claim 1 wherein the activated set-delayed cement composition is free of Portland cement.

9. The composition of claim 1 wherein the hydrated lime is present from about 10% to about 50% by weight of the pumice.

10. An activated set-delayed cement composition comprising:
    water;
    pumice;
    hydrated lime;
    a phosphonic acid derivative set retarder;
    a polycarboxylated ether dispersant; and
    a cement set activator comprising a combination of a polyphosphate and a monovalent salt.

11. The composition of claim 10 wherein the cement set activator is present in the activated set-delayed cement composition in an amount of about 0.1% to about 20% by weight of the activated set-delayed cement composition.

12. The composition of claim 10 wherein the polyphosphate comprises sodium hexametaphosphate, and wherein the monovalent salt comprises sodium sulfate.

13. The composition of claim 10 wherein the ratio of the monovalent salt to the polyphosphate is from about 2:1 to about 1:25.

14. The composition of claim 10 wherein the cement set activator further comprises nanosilica, wherein the nanosilica has been stabilized by at least one nanosilica stabilizer selected from the group consisting of: sodium oxide, potassium oxide, lithium oxide, an amine, and any combination thereof.

15. The composition of claim 10 wherein the phosphonic acid derivative set retarder comprises at least one retarder selected from the group consisting of a methylene phosphonic acid derivative and a methylene phosphonate.

16. The composition of claim 10 wherein the activated set-delayed cement composition is free of Portland cement.

* * * * *